(12) United States Patent  
Nimura et al.

(10) Patent No.: US 8,959,306 B2  
(45) Date of Patent: Feb. 17, 2015

(54) STORAGE DEVICE, SWEEP OPERATION CONTROL METHOD AND SWEEP OPERATION CONTROL PROGRAM

(71) Applicant: Fujitsu Limited, Kawasaki-shi, Kanagawa (JP)

(72) Inventors: Koutarou Nimura, Kawasaki (JP); Marie Abe, Kawasaki (JP); Masatoshi Nakamura, Machida (JP); Yoshihito Konta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/098,699

(22) Filed: Dec. 6, 2013

(65) Prior Publication Data

US 2014/0198406 A1 Jul. 17, 2014

(30) Foreign Application Priority Data

Jan. 15, 2013 (JP) ................................. 2013-005000

(51) Int. Cl.
*G11B 5/725* (2006.01)
*G06F 3/06* (2006.01)

(52) U.S. Cl.
CPC ........................................ *G06F 3/06* (2013.01)
USPC ............. 711/167; 711/114; 360/75; 360/230; 714/6.22

(58) Field of Classification Search
CPC .......... G11B 5/71; G11B 5/725; G11B 9/065; G11B 23/0071; G11B 5/004; G11B 5/008; G11B 5/012; G11B 5/02
USPC ..................... 360/55, 230, 234, 234.1, 71, 75; 714/6.22; 711/100, 114, 111, 167, 168
See application file for complete search history.

(56) References Cited

U.S. PATENT DOCUMENTS

| | | | |
|---|---|---|---|
| 5,202,803 A * | 4/1993 | Albrecht et al. ............ | 360/99.18 |
| 5,491,816 A | 2/1996 | Matoba et al. | |
| 5,615,368 A | 3/1997 | Terashima et al. | |
| 5,822,163 A * | 10/1998 | Lee et al. ....................... | 360/135 |
| 6,181,517 B1 * | 1/2001 | Yanagisawa et al. ....... | 360/235.4 |
| 7,281,088 B2 * | 10/2007 | Yamazaki et al. ............ | 711/114 |
| 2002/0030926 A1 * | 3/2002 | Teshima ..................... | 360/99.08 |
| 2003/0086200 A1 * | 5/2003 | Tokizono et al. ........... | 360/78.06 |
| 2003/0223315 A1 * | 12/2003 | Gillis et al. ................. | 369/13.01 |
| 2005/0160221 A1 * | 7/2005 | Yamazaki et al. ............ | 711/114 |
| 2007/0109744 A1 * | 5/2007 | Matsushima et al. ......... | 361/695 |
| 2010/0195248 A1 * | 8/2010 | Yamada et al. ................ | 360/129 |

FOREIGN PATENT DOCUMENTS

| | | |
|---|---|---|
| JP | 6-67812 | 3/1994 |
| JP | 7-281966 | 10/1995 |

* cited by examiner

*Primary Examiner* — Thomas Alunkal
(74) *Attorney, Agent, or Firm* — Staas & Halsey LLP

(57) ABSTRACT

A storage device which includes a plurality of magnetic disk drives has a storage unit that stores, for each of the plurality of magnetic disk drives, information of whether or not the magnetic disk drive is incorporated in a redundant structure, a specifying unit that specifies, among the plurality of magnetic disk drives, a plurality of magnetic disk drives which have a redundant structure on the basis of the information stored in the storage unit, and a control unit that controls, for the plurality of magnetic disk drives specified by the specifying unit, an execution timing of sweep operation in which a head smoothes a lubricant material such that the sweep operation is executed for a single magnetic disk drive at a time.

8 Claims, 9 Drawing Sheets

FIG. 2A

| DISK IDENTIFIER | RAID GROUP | ACTUAL DISK CAPACITY (GB) | USABLE DISK CAPACITY (GB) | TARGET DISK | HEAD MOVING DISTANCE (TRACK) | SWEEP OPERATION TIME (SEC) |
|---|---|---|---|---|---|---|
| A1 | #0 | 300 | 40 | O | 1000 | 10 |
| A2 | #0 | 300 | 45 | O | 1000 | 10 |
| A3 | #0 | 300 | 30 | O | 1000 | 10 |
| A4 | #0 | 300 | 45 | O | 1000 | 10 |
| A5 | #0 | 300 | 80 | X | 1000 | 10 |
| B1 | #1 | 300 | 45 | O | 1000 | 10 |
| B2 | #1 | 300 | 300 | X | 1000 | 10 |
| B3 | #1 | 300 | 40 | O | 1000 | 10 |

FIG. 2B

| RAID GROUP | RAID LEVEL |
|---|---|
| #0 | RAID1+0 |
| #1 | RAID1 |

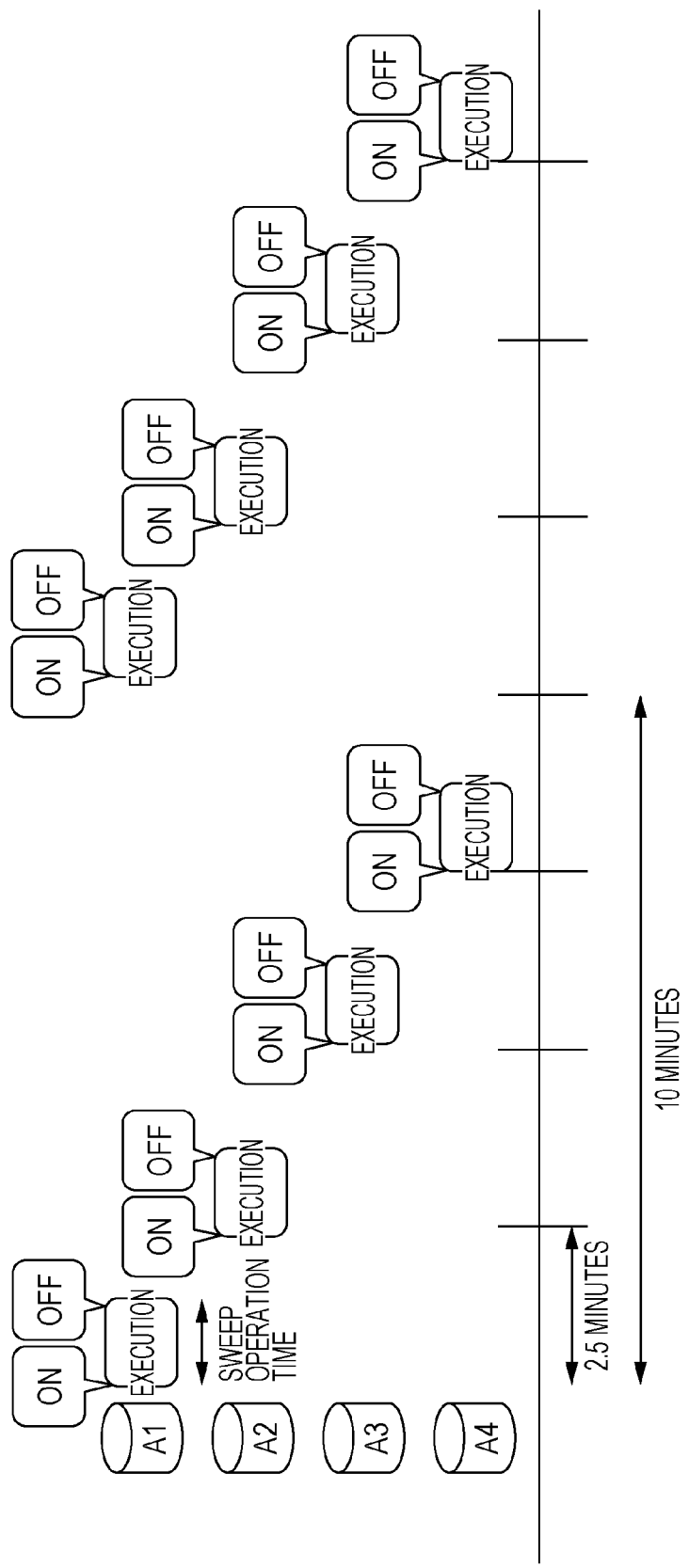

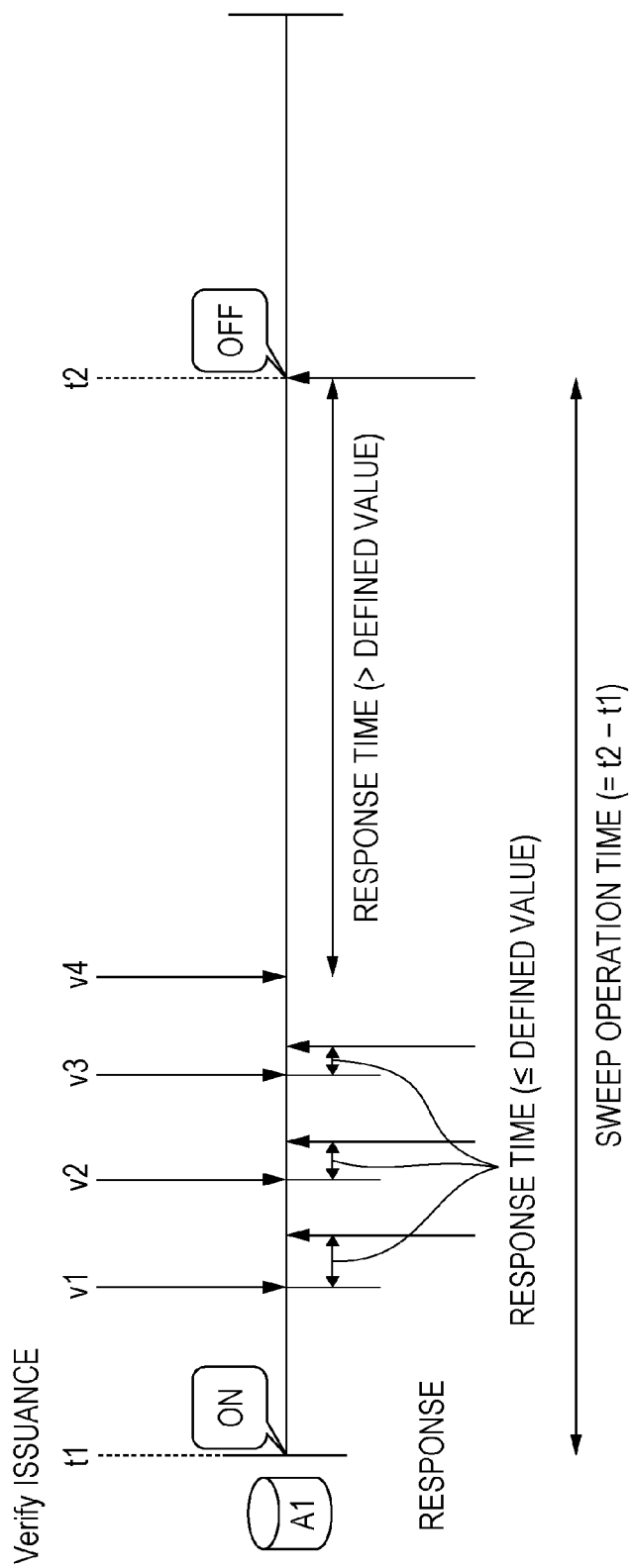

though the following description of the present disclosure is not be re-inventive. They are provided to give context.

STORAGE DEVICE, SWEEP OPERATION CONTROL METHOD AND SWEEP OPERATION CONTROL PROGRAM

CROSS-REFERENCE TO RELATED APPLICATION

This application is based upon and claims the benefit of priority of the prior Japanese Patent Application No. 2013-005000, filed on Jan. 15, 2013, the entire contents of which are incorporated herein by reference.

FIELD

The embodiments discussed herein are related to a storage device and so forth.

BACKGROUND

Lubricant oil used for smoothing the operation of a head is applied on a medium of a hard disk drive (HDD) provided in a storage device. It has been known that, in accessing to the medium of the HDD, when only the outer side or inner side of the medium is used, a rut of the lubricant oil is likely to be generated between the inner side and the outer side.

When a rut is generated, errors in the head and the medium of the HDD drastically increase and become a cause of a failure in the HDD. Therefore, as a function of reducing the generation of a rut, a lubricant oil sweep function which is controlled in the HDD is used. The lubricant oil sweep function is a function of leveling the lubricant oil on the medium of the HDD. The lubricant oil sweep function is set effective or ineffective for each HDD, and when the function is set effective, a failure rate in the HDD may be reduced.

Japanese Laid-open Patent Publication No. 06-67812 describes the related technique.

However, there are cases where, when the lubricant oil sweep function is effective, a delay of response to a superordinate device occurs. That is, when the lubricant oil sweep function is effective in order to reduce the failure rate in an HDD, a delay of response to a superordinate device might not be avoided.

For example, when an access request from a superordinate device to an HDD and the lubricant oil sweep function in the HDD compete against one another, the access to the HDD stops. Then, after the operation of the lubricant oil sweep function ends, the access to the HDD which has stopped restarts, and the HDD returns a response to the superordinate device after the completion of the access thereto. While a response to write processing when the operation of the lubricant oil sweep function has not occurred is several milliseconds (ms), a response to write processing when the operation of the lubricant oil sweep function has occurred is 500 milliseconds (ms). Therefore, when the access to the HDD and the lubricant oil sweep function compete against one another, the delay of a response to the superordinate device is not avoided.

In a storage device in which a plurality of HDDs form RAID groups, when the operation of the lubricant oil sweep function occurs simultaneously in the HDDs in the same RAID group, an access stops in each of the HDDs which are operated, and thus, a delay of a response to the superordinate device is not avoided.

An advantage of some aspects of the present disclosure is that a technique for avoiding the delay of a response to a superordinate device may be achieved.

SUMMARY

According to an aspect of the application, an apparatus having a plurality of magnetic disk drives includes a storage unit that stores, for each of the plurality of magnetic disk drives, information of whether or not the magnetic disk drive is incorporated in a redundant structure, a specifying unit that specifies, among the plurality of magnetic disk drives, a plurality of magnetic disk drives which have a redundant structure on the basis of the information stored in the storage unit, and a control unit that controls, for the plurality of magnetic disk drives specified by the specifying unit, an execution timing of sweep operation in which a head smoothes a lubricant material such that the sweep operation is executed for a single magnetic disk drive at a time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a table illustrating an example data structure of a disk information storage unit;

FIG. 2B is a table illustrating an example data structure of a RAID information storage unit;

FIG. 3 is a diagram illustrating a sweep operation control according to an embodiment;

FIG. 4 is a diagram illustrating calculation of sweep operation time according to an embodiment;

DESCRIPTION OF EMBODIMENTS

Hereinafter, embodiments of a storage device, a sweep operation control method, and a sweep operation control program according to the present disclosure are described in detail with reference to the accompanying drawings. Note that the present disclosure is not limited by the following embodiments. Each of the embodiments may be combined as appropriate within a range that does not contradict the processing contents. A case where the present disclosure is applied to a storage device is hereinafter described.

Embodiments

Configuration of Storage Device According to an Embodiment

Figure 1:
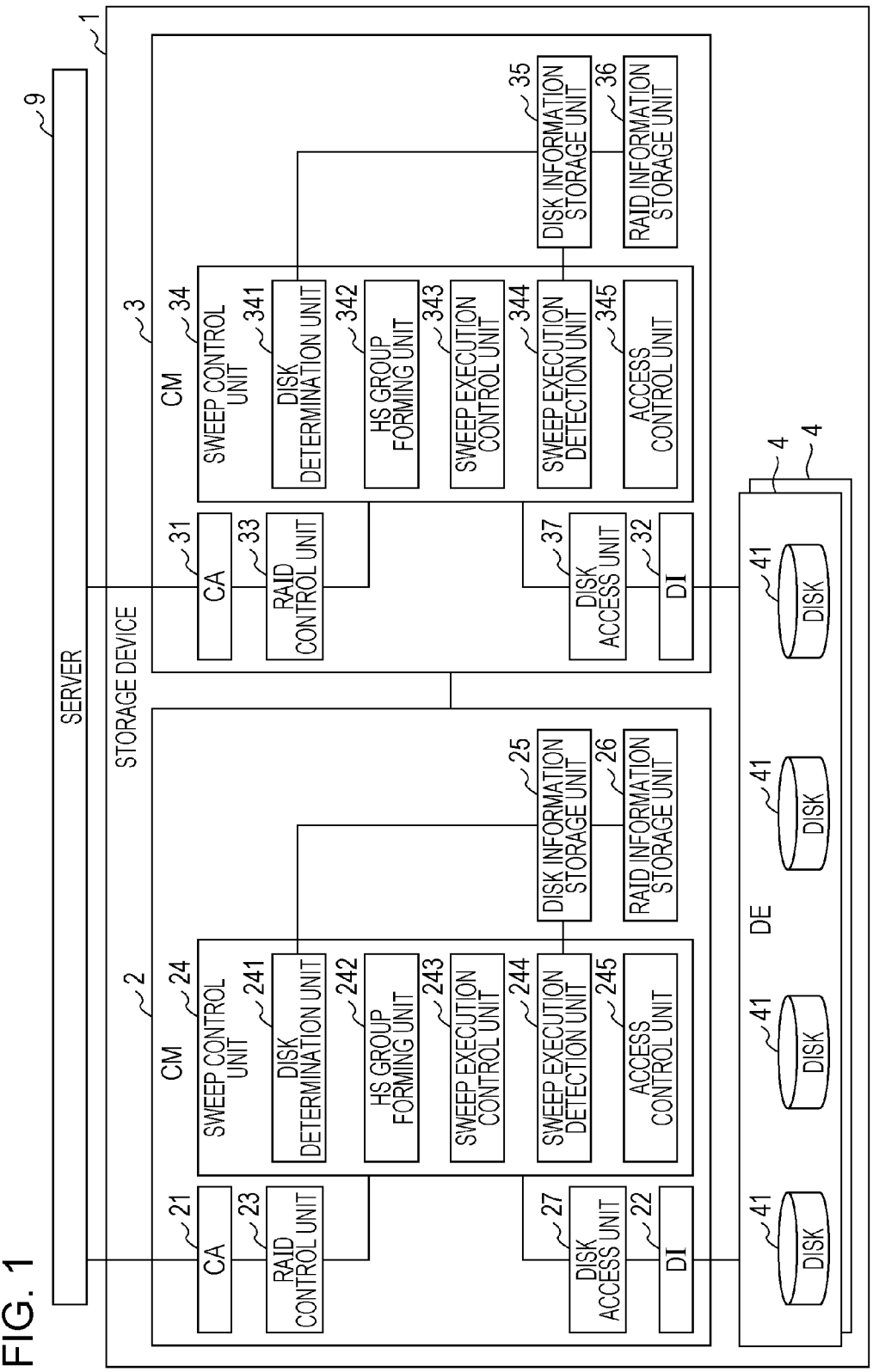
FIG. 1 is an example diagram illustrating a hardware configuration of a storage device according to an embodiment.

FIG. 1 is a diagram illustrating a hardware configuration of a storage device according to an embodiment. As illustrated in FIG. 1, a storage device 1 includes a plurality of controller modules (CMs) 2 and 3, and a plurality of disk enclosures (DEs) 4. The CMs 2 and 3 are connected to one another. Each of the CMs 2 and 3 is duplicated and is connected to the corresponding one of the DEs 4. Furthermore, each of the CMs 2 and 3 is connected to a server 9.

The DE 4 is a case in which a plurality of disk drives (which are hereinafter referred to as "disks") 41 are mounted. The plurality of disks 41 forms a redundant array of inexpensive disks (RAID) group that makes data redundant. The RAID group is grouped, for example, at a RAID level of RAID 1 or RAID 1+0.

The CMs 2 and 3 are controllers of the storage device 1. Furthermore, the CM 2 includes a CA 21, a DI 22, a RAID control unit 23, a sweep control unit 24, a disk information storage unit 25, a RAID information storage unit 26, and a disk access unit 27. Note that the CM 3 has a similar configuration to that of the CM 2, and therefore, the description thereof is omitted.

The CA 21 is a connection interface with the server 9. The DI 22 is a connection interface with the DE 4.

The RAID control unit 23 controls various processes, such as data write, data readout, and so forth, performed on the disks 41 via the sweep control unit 24. For example, when the RAID control unit 23 receives from the CA 21 a data write request transmitted from the server 9, the RAID control unit 23 outputs a data write request to an access control unit 245 of the sweep control unit 24, which is described later. The data write request includes, for example, write data and the identifier of one of the disks 41 to which the data is written. Also, when the RAID control unit 23 receives from the CA 21 a data readout request transmitted from the server 9, the RAID control unit 23 outputs the data readout request to the access control unit 245. The data readout request includes, for example, the identifier of one of the disks 41 from which data is read out and the address of read data. When the RAID control unit 23 obtains information indicating that it has been accessed by the access control unit 245, the RAID control unit 23 returns a response corresponding to the data write request or the data readout request to the server 9 via the CA 21.

The sweep control unit 24 controls the lubricant oil sweep function (which is hereinafter referred to as the "sweep function") for each disk 41, and controls access to each disk 41. In this embodiment, the sweep control unit 24 controls execution timing of the operation of the sweep function (which is referred to as the "sweep operation") for the disks 41, among the plurality of disks 41, included in the same RAID group such that the number of the disks 41 included in the same group on which the sweep operation is executed at a time is one. Then, the sweep control unit 24 controls access to each of the disks 41 such that the sweep operation of the disk 41 and an access to the disk 41 do not compete against one another.

The sweep control unit 24 includes a disk determination unit 241, an HS group forming unit 242, a sweep execution control unit 243, a sweep execution detection unit 244, and an access control unit 245.

The disk determination unit 241 determines a disk (a target disk) on which control of the sweep function is performed. For example, the disk determination unit 241 determines for each of the disks 41 in the DE 4 whether or not the sweep function is provided therein. Then, the disk determination unit 241 determines, for the disk 41 which has been determined that the sweep function is provided therein, whether or not a rut is likely to be generated. As an example, whether or not a rut is likely to be generated is determined by determining whether or not the usable capacity of a disk is less than a predetermined ratio (for example, 15%) to the entire actual disk capacity. This is because, when a moving distance of a head during a seek operation is short, the lubricant oil is likely to be pooled and a rut is likely to be generated. The disk determination unit 241 determines, for the disk 41 which has been determined that a rut is likely to be generated therein, whether or not it has a redundant structure, and determines the disk 41 determined to have a redundant structure as a target disk. The processing performed by the disk determination unit 241 is performed using the disk information storage unit 25 that stores information of each disk 41 and the RAID information storage unit 26. Note that the processing performed by the disk determination unit 241 may be executed, for example, when the power of the storage device 1 is turned on.

The data structure of the disk information storage unit 25 is hereinafter described with reference to FIG. 2A. FIG. 2A is a table illustrating an example data structure of a disk information storage unit. As illustrated in FIG. 2A, the disk information storage unit 25 stores a disk identifier 25a, a RAID group 25b, an actual disk capacity 25c, a usable disk capacity 25d, a target disk 25e, a head moving distance 25f, and a sweep operation time 25g in association with one another.

The disk identifier 25a is the identifier of the disk 41. The RAID group 25b is the identifier of the RAID group to which the disk 41 belongs. For example, the disk determination unit 241 may use the RAID group 25b as a key to obtain a RAID level from the RAID information storage unit 26, which is described later, and determine, for the determination target disk 41, whether or not it has a redundant structure using the obtained RAID level.

The actual disk capacity 25c is the actual capacity of the entire disk 41. The usable disk capacity 25d is the capacity of the disk 41 that may be actually used. For example, the disk determination unit 241 may determine, for the determination target disk 41, whether or not a rut is likely to be generated using the actual disk capacity 25c and the usable disk capacity 25d. That is, the disk determination unit 241 may determine whether or not the usable disk capacity 25d corresponding to the determination target disk 41 is less than, for example, 15% of the actual disk capacity 25c, and may determine, if the usable disk capacity 25d is less than 15%, that a rut is likely to be generated.

The target disk 25e denotes a disk (a target disk) on which control of the sweep function is performed. As an example, if the disk is a target disk, "○" is set, and if a disk is not a target disk, "x" is set. For example, as a result of determination, for a disk that is a target of control of the sweep function, the disk determination unit 241 may set "○" to the target disk 25e.

The head moving distance 25f is a distance by which the head may move during a seek operation. For example, when the usable capacity of the disk 41 is smaller than the actual capacity of the disk, the head moving distance 25f is shorter than the maximum length (the radius of the disk). The head moving distance 25f is used with the actual disk capacity 25c and the usable disk capacity 25d in determination of whether or not a rut is likely to be generated. The sweep operation time 25g is time used to perform the sweep operation of the disk 41. The sweep operation time 25g is described later.

As an example, when the disk identifier 25a is "A2", "#0", "300" GB, and "45" GB are stored as the RAID group 25b, the actual disk capacity 25c, and the usable disk capacity 25d, respectively. Also, "○", "1000" tracks, and "10" seconds are stored as the target disk 25e, the head moving distance 25f, and the sweep operation time 25g, respectively.

The data structure of the RAID information storage unit 26 is described with reference to FIG. 2B. FIG. 2B is a table illustrating an example data structure of a RAID information storage unit. As illustrated in FIG. 2B, the RAID information storage unit 26 stores a RAID group 26a and a RAID level 26b in association with one another.

The RAID group 26a is the identifier of the RAID group to which the disk 41 belongs and corresponds to the RAID group 25b of the disk information storage unit 25. The RAID level 26b is the RAID level of the RAID group. As an example, when the RAID group 26a is "#0", "RAID 1+0" is stored as the RAID level 26b.

For the disk 41 which has been determined not to have a redundant structure by the disk determination unit 241, if it is a hot spare (HS), the HS group forming unit 242 forms an HS group of HSs included in a device including the HS, which corresponds to the RAID group. The HS herein means a spare disk as a spare disk used to alternate a disk in which a failure occurs. The purpose of this is that, similar to the disks 41 in the RAID group, the HSs in the HS group are caused to be targets on which control of the sweep function is performed.

The sweep execution control unit 243 controls a start of execution of the sweep function for the plurality of disks 41 which belong to the same RAID group. The sweep execution control unit 243 performs "pre-sweep execution processing" and "sweep execution processing".

As "pre-sweep execution processing", the sweep execution control unit 243 calculates, for the plurality of disks 41 which belong to the same RAID group, the issuance interval of an instruction (a sweep on command) that is sequentially issued to promote the sweep operation such that the issuance intervals of the plurality of disks 41 are averaged. For example, the sweep execution control unit 243 uses the target disk 25e stored in the disk information storage unit 25 to retrieve the number of target disks which belong to the same RAID group. Then, the sweep execution control unit 243 divides, if it is one disk 41, the retrieved number of the target disks by the interval (N) with which the sweep function is executed. Then, the sweep execution control unit 243 sets a value obtained by the division to be an issuance interval of the sweep on command. If N is 600 seconds (10 minutes) and the number of target disks is two, the issuance interval of the sweep on command is a five-minute interval. Note that N is preferably 10 minutes in order to reduce the failure rate in the disk 41, but is not limited thereto. N is set variable in the range from one second to 65535 seconds.

As the "sweep execution processing", the sweep execution control unit 243 controls the execution time of the sweep operation for the target disks which belong to the same RAID group using the calculated issuance interval of the sweep on command. For example, the sweep execution control unit 243 determines, for each target disk, whether or not the sweep execution time is reached using the issuance interval of the sweep on command. Then, the sweep execution control unit 243 issues the sweep on command to the target disk determined that the sweep execution time is reached therefor.

Thus, the sweep execution control unit 243 may sequentially issue the sweep on command to the plurality of disks 41 using the issuance interval of the sweep on command, and accordingly, may perform control such that only one of the disks 41 in the same RAID group is in the sweeping operation.

The sweep execution detection unit 244 detects that the sweep operation has been actually executed for the target data to which the sweep on command has been issued. That is, in the target disk, even when the sweep on command is issued, the sweep operation is not typically actually executed immediately. Thus, the sweep execution detection unit 244 detects that the sweep operation has been actually executed after the sweep on command has been issued.

For example, the sweep execution detection unit 244 issues, for the target disk to which the sweep on command has been issued, a predetermined command that causes an access to the target disk on a regular basis. Then, the sweep execution detection unit 244 determines whether or not response time from the issuance of the predetermined command to the return of a response exceeds a defined value. That is, if the sweep operation has not been actually executed, the response time from the issuance of the predetermined command to the return of a response does not exceed the defined value, while, if the sweep operation has been executed, the response time exceeds the defined time. If the sweep execution detection unit 244 determines that the response time exceeds the defined value, the sweep execution detection unit 244 determines that the sweep operation has been actually executed, issues a sweep off command, and calculates sweep operation time that indicates the execution timing of the sweep operation. The sweep operation time in this case means time from the issuance of the sweep on command to the issuance of the sweep off command. That is, the sweep execution detection unit 244 calculates as the sweep operation time a difference between the time at which the sweep off command is issued and the time at which the sweep on command is issued. As an example, as the predetermined command, a Verify command that verifies whether or not, for example, a write has been correctly performed is used. As the timing with which the Verify command is issued on a regular basis, 100 milliseconds (ms) is used. As the defined value used in determining that the sweep operation has been executed, 400 ms is used. Note that the timing with which the Verify command is issued on a regular basis is not limited to 100 ms, and may be a value larger than the response time when the sweep operation has not been executed. The defined value is not limited to 400 ms, and may be a value with which it is determined that the sweep operation has been executed.

Also, the sweep execution detection unit 244 stores the average of the sweep operation time calculated from the calculated sweep operation time and the sweep operation time that has been calculated in past in the sweep operation time 25g corresponding to the target disk of the disk information storage unit 25.

The access control unit 245 monitors the sweep operation time for each target disk. Then, when a readout request is transmitted from the server 9 to the target disk, the access control unit 245 controls the redundant target disk such that the redundant target disk executes a readout. That is, the access control unit 245 executes a degenerate readout using a redundant disk for a target disk for which the sweep operation and the readout request transmitted from the server 9 compete against one another. For example, the access control unit 245 specifies the target disk to which the sweep on command is to be issued and monitors the sweep operation time of the specified target disk. The sweep operation time of the target disk is obtained from the disk information storage unit 25. If there is a readout request transmitted from the server 9 during the sweep operation time of the specified target disk, the access control unit 245 executes a readout from another target disk in the same RAID group. Thus, the access control unit 245 has no delay of a response due to a sweep cause in the readout request.

The access control unit 245 monitors the sweep operation time for each target disk. Then, when a write request is transmitted from the server 9 to the target disk at the time to be the sweep operation time of the target disk, the access control unit 245 perform control such that a write to the HS is executed. That is, for the target disk for which the sweep operation and the write request transmitted from the server 9 compete against one another, the access control unit 245 executes a write to an unused HS, if there is any. Note that the unused HS herein means a disk for which sweep is not operated. For example, the access control unit 245 specifies a target disk at the issuance of the sweep on command and monitors the sweep operation time of the specified target disk. The sweep operation time of the target disk is obtained from the disk information storage unit 25. If there is a write request transmitted from the server 9 during the sweep operation time of the specified target disk, the access control unit 245 executes a write to the unused HS. Thus, the access control unit 245 has no delay of a response due to a sweep cause in the write request. Note that the access control unit 245 may copy back data from the HS to the target disk after the completion of the sweep operation, and restore data to the target data.

The disk access unit 27 accesses a specified disk on the basis of an instruction transmitted from the access control unit 245.

Next, the sweep operation control performed by the sweep execution control unit 243 and the sweep execution detection unit 244 is described with reference to FIG. 3. FIG. 3 is a diagram illustrating a sweep operation control according to an embodiment. Note that, in FIG. 3, A1-A4 denote target disks of the same RAID group. The interval (N) at which the sweep function is executed is 600 seconds (10 minutes).

As illustrated in FIG. 3, the sweep execution control unit 243 divides the number of the target disks by the interval (N) at which the sweep function is executed to calculate the issuance interval of the sweep on command. In this case, because N is 600 (seconds) and the number of the target disks is four, the issuance interval of the sweep on command is calculated to be 150 (seconds), that is, 2.5 minutes.

Then, the sweep execution control unit 243 determines, for the target disks A1-A4 of the same RAID group, whether or not the sweep execution time is reached using the calculated issuance interval of the sweep on command. Then, the sweep execution control unit 243 issues the sweep on command to the target disk for which the sweep execution time is reached. In this case, assume that the sweep execution time is reached for the target disk A1. Then, the sweep execution control unit 243 issues the sweep on command to the target disk A1.

When the sweep execution detection unit 244 determines that the sweep operation has been actually executed for the target disk A1 to which the sweep on command has been issued, the sweep execution detection unit 244 issues the sweep off command. Then, the sweep execution detection unit 244 calculates the sweep operation time using the time at which the sweep on command is issued and the time at which the issuance of the sweep off command is issued. In this case, for the target disk A1, the sweep execution detection unit 244 calculates as the sweep operation time a difference between the time at which the sweep off command is issued and the time at which the sweep on command is issued. The calculated time is used as the sweep operation time of the target disk A1 in the access control unit 245.

Next, calculation of the sweep operation time performed by the sweep execution control unit 243 and the sweep execution detection unit 244 is described with reference to FIG. 4. FIG. 4 is a diagram illustrating calculation of sweep operation time according to an embodiment. Note that, in FIG. 4, the disk to which the sweep on command has been issued by the sweep execution control unit 243 is the target disk A1.

As illustrated in FIG. 4, the sweep execution detection unit 244 issues, for the target disk A1 to which the sweep on command has been issued, the Verify command on a regular basis. Then, each time the sweep execution detection unit 244 issues the Verify command, the sweep execution detection unit 244 determines whether or not the response time from the issuance of the Verify command to the return of a response exceeds the defined value or not. If the sweep execution detection unit 244 determines that the response time exceeds the defined value, the sweep execution detection unit 244 determines that the sweep operation has been actually executed. Then, the sweep execution detection unit 244 issues the sweep off command. In this case, it is assumed that the Verify commands v1, v2, v3, and v4 are issued on a regular basis. When the Verify commands v1, v2, and v3 are issued, the response time is equal to or less then the defined value, and the sweep execution detection unit 244 determines that the sweep operation has not been actually executed. When the Verify command v4 is issued, the response time exceeds the defined value, the sweep execution detection unit 244 determines that the sweep operation has been actually executed and issues the sweep off command.

The sweep execution detection unit 244 calculates a difference between the time at which the sweep off command is issued and the time at which the sweep on command is issued to obtain the sweep operation time. In this case, the sweep execution detection unit 244 calculates a difference between the time t2 at which the sweep off command is issued and the time t1 at which the sweep on command is issued to obtain the sweep operation time ($=t2-t1$).

Flowchart of Disk Determination Processing

Figure 5:
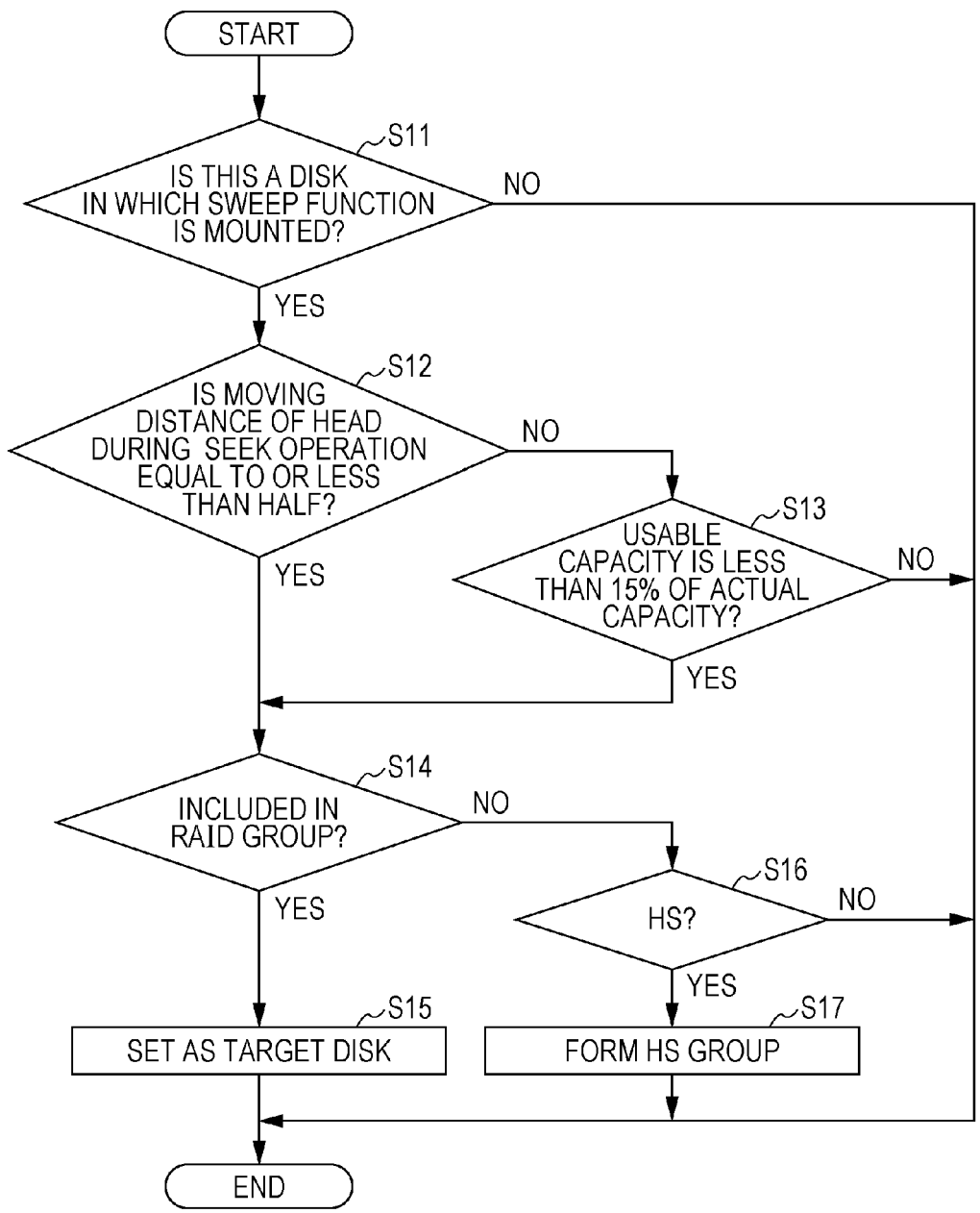
FIG. 5 is a flowchart of disk determination processing.

Next, disk determination processing according to an embodiment is described with reference with FIG. 5. FIG. 5 is a flowchart of disk determination processing. Note that the processing illustrated in FIG. 5 is started when the power of the storage device 1 is turned on. Also, in FIG. 5, the disk determination unit 241 selects the disks 41 in the DE 4 one by one and performs the following disk determination processing for the selected disk.

First, the disk determination unit 241 determines, for the selected disk 41, whether or not the sweep function is mounted therein (Operation S11). For example, the disk determination unit 241 reads out the model number of the selected disk 41 and determines whether or not the sweep function is mounted therein using the read out model number.

If the disk determination unit 241 determines that the sweep function is not mounted (NO in Operation S11), the disk determination unit 241 ends disk determination processing. On the other hand, if the disk determination unit 241 determines that the sweep function is mounted (YES in Operation S11), the disk determination unit 241 determines whether or not the moving distance of the head at a seek operation is equal to or less than the maximum length (the radius of the disk) (Operation S12). The purpose of this operation is to determine whether or not a rut is likely to be generated. For example, the disk determination unit 241 reads out the head moving distance 25f corresponding to the selected disk at a seek operation from the disk information storage unit 25. Then, the disk determination unit 241 determines whether or not the read out head moving distance is equal to or less than the maximum length of the head moving distance discerned on the basis of the type of the selected disk.

If the disk determination unit 241 determines that the head moving distance at a seek operation is equal to or less than the maximum length (YES in Operation S12), the disk determination unit 241 determines that a rut is likely to be generated and the process proceeds to Operation S14. That is, when the head moving distance at a seek operation is short, the lubricant oil is likely to be pooled and a rut is likely to be generated.

On the other hand, if the disk determination unit 241 determines that the head moving distance at a seek operation is not equal to or less than the maximum length (NO in Operation S12), the disk determination unit 241 determines whether or not the usable disk capacity is less than 15% of the actual capacity of the entire disk (Operation S13). The purpose of this operation is to determine whether or not, even when the head moving distance at a seek operation is not equal to or less than the maximum length, a rut is likely to be generated. For example, the disk determination unit 241 reads out the actual disk capacity 25c and the usable disk capacity 25d which correspond to the selected disk from the disk information storage unit 25. Then, the disk determination unit 241 determines whether or not the read out usable disk capacity 25d is less than 15% of the read out actual disk capacity 25c.

If the disk determination unit 241 determines that the disk usable capacity is equal to or more than 15% of the actual capacity of the entire disk (NO in Operation S13), the disk determination unit 241 determines that a rut is not likely to be generated and ends disk determination processing. On the other hand, the disk determination unit 241 determines that the disk usable capacity is less than 15% of the actual capacity of the entire disk (YES in Operation S13), the disk determination unit 241 determines that a rut is likely to be generated and the process proceeds to Operation S14. That is, when the head moving distance at a seek operation is short, the lubricant oil is likely to be pooled and a rut is likely to be generated.

In Operation S14, the disk determination unit 241 determines whether or not the selected disk is included in the RAID group (Operation S14). For example, the disk determination unit 241 reads out the RAID group 25b corresponding to the selected disk from the disk information storage unit 25. The disk determination unit 241 reads out the RAID level 26b corresponding to the read out RAID group from the RAID information storage unit 26. Then, the disk determination unit 241 determines whether or not the read out RAID level is the level of the redundant structure.

If the disk determination unit 241 determines that the selected disk is included in the RAID group (YES in Operation S14), the disk determination unit 241 sets the selected disk as a target disk in the target disk 25e of the disk information storage unit 25 (Operation S15). For example, the disk determination unit 241 sets "○" that indicates that the selected disk is a target disk in the target disk 25e of the disk identifier 25a corresponding to the selected disk. Then, the disk determination unit 241 ends disk determination processing.

On the other hand, if the disk determination unit 241 determines that the selected disk is not included in the RAID group (NO in Operation S14), the HS group forming unit 242 determines whether or not the disk selected by the disk determination unit 241 is an HS (Operation S16). If the HS group forming unit 242 determines that the selected disk is an HS (YES in Operation S16), the HS group forming unit 242 forms an HS group of HSs provided in the device including the HS (Operation S17). The purpose for this operation is to cause, similar to the disks 41 in the RAID group, the HSs in the HS group to be targets of control of the sweep function. Then, the HS group forming unit 242 ends disk determination processing.

Flowchart of Sweep Execution Control Processing (Pre-Sweep Execution Processing)

Figure 6:
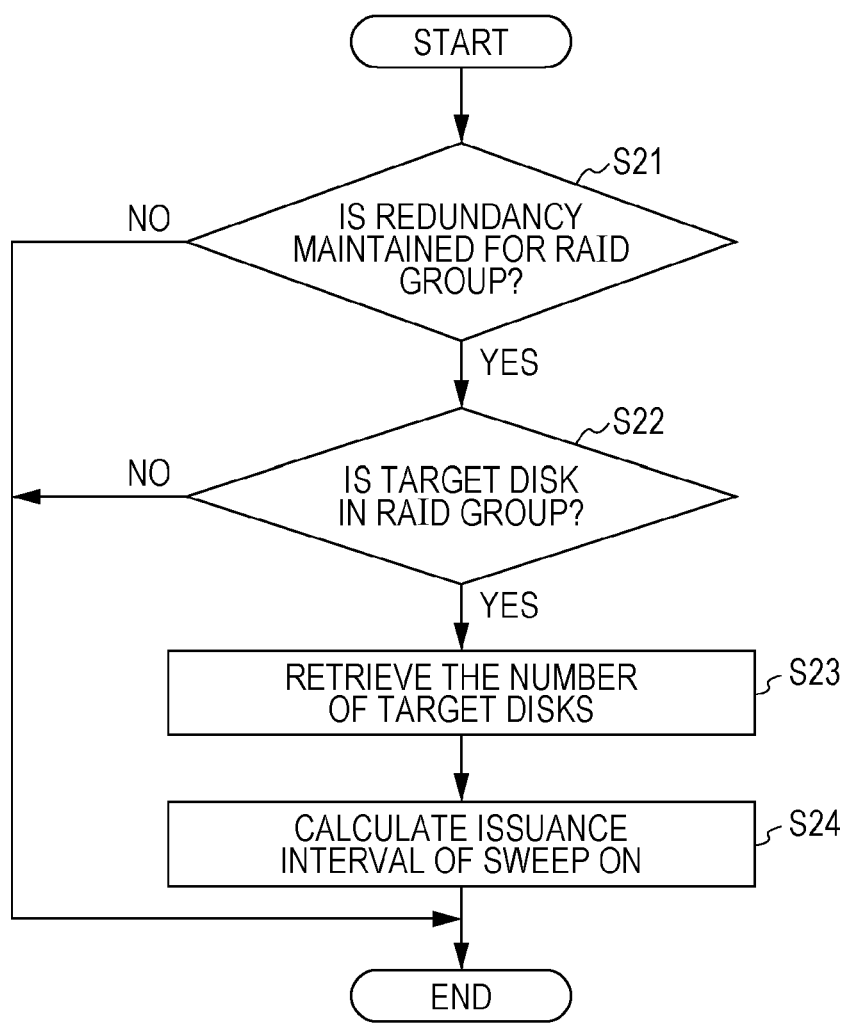
FIG. 6 is a flowchart of sweep execution operation processing (pre-sweep execution processing)

Next, sweep execution control processing in pre-sweep execution processing is described with reference to FIG. 6. FIG. 6 is a flowchart of sweep execution operation processing (pre-sweep execution processing). Note that, in FIG. 6, the storage device 1 is in a state immediately after it is operated and the processing illustrated in FIG. 6 may be started and, for example, after the processing of the disk determination unit 241 is executed. Also, in FIG. 6, the sweep execution control unit 243 selects RAID groups one by one, and performs the following processing to the selected RAID group.

The sweep execution control unit 243 determines, for the selected RAID group, whether or not redundancy is maintained (Operation S21). If the sweep execution control unit 243 determines that redundancy is not maintained (NO in Operation S21), the sweep execution control unit 243 ends sweep execution control processing for the selected RAID group.

On the other hand, if the sweep execution control unit 243 determines that redundancy is maintained (YES in Operation S21), the sweep execution control unit 243 determines whether or not there is a target disk in the selected RAID group (Operation S22). For example, the sweep execution control unit 243 reads out the target disk 25e corresponding to the selected RAID group from the disk information storage unit 25. Then, the sweep execution control unit 243 determines whether or not "○" that indicates the target disk is included in the read out target disk 25e.

If the sweep execution control unit 243 determines that there is no target disk in the selected RAID group (NO in Operation S22), the sweep execution control unit 243 ends sweep execution control processing for the selected RAID group. On the other hand, if the sweep execution control unit 243 determines that there is a target disk in the selected RAID group (YES in Operation S22), the sweep execution control unit 243 retrieves the number of target disks (Operation S23). For example, the sweep execution control unit 243 retrieves the number of "○" that indicates the target disk 25e read out from the disk information storage unit 25.

The sweep execution control unit 243 calculates the issuance interval of sweep on (Operation S24). For example, the sweep execution control unit 243 divides the retrieved number of target disks by the interval (N) at which the sweep function is executed for a disk. The sweep execution control unit 243 sets the value obtained by the division as the issuance interval of the sweep on. Then, the sweep execution control unit 243 ends sweep execution control processing for the selected RAID group.

Flowchart of Sweep Execution Control Processing (Sweep Execution Processing)

Figure 7:
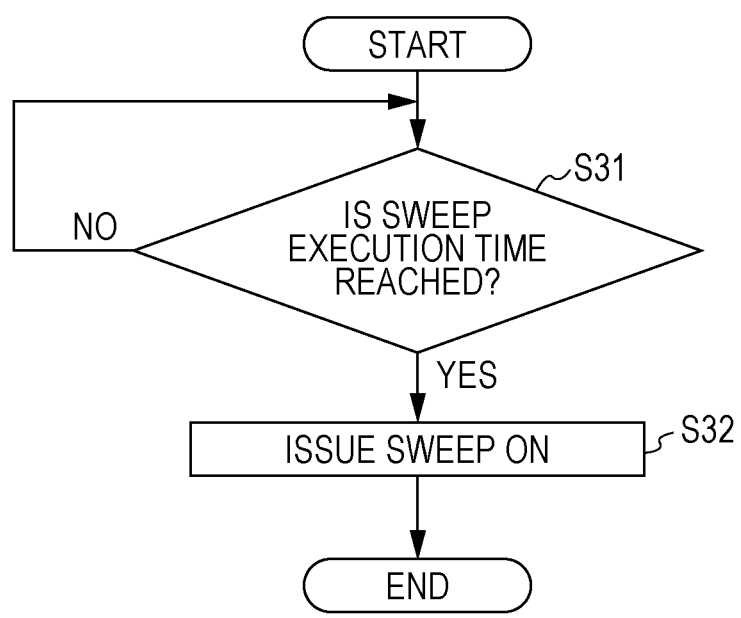
FIG. 7 is a flowchart of sweep execution operation processing (sweep execution processing)

Next, sweep execution control processing in sweep execution processing is described with reference to FIG. 7. FIG. 7 is a flowchart of sweep execution control processing (sweep execution processing). Note that, in FIG. 7, the storage device 1 is operated and, for example, the processing illustrated in FIG. 7 may be started after pre-sweep execution processing of the sweep execution control unit 243 is executed. Also, in FIG. 7, the sweep execution control unit 243 performs the following processing for each target disk included in the RAID group for which redundancy is maintained.

The sweep execution control unit 243 determines, for the target disk, whether or not the sweep execution time is reached using the issuance interval of the sweep on corresponding to the RAID group, which has been calculated by pre-sweep execution processing (Operation S31). If the sweep execution control unit 243 determines, for the target disk, that the sweep execution time is not reached (NO in Operation S31), the sweep execution control unit 243 repeats determination processing until the sweep execution control unit 243 determines that the sweep execution time is reached.

On the other hand, when the sweep execution control unit 243 determines that the sweep execution time is reached (YES in Operation S31), the sweep execution control unit 243 issues the sweep on command to the target disk for which the sweep execution time is reached (Operation S32).

Flowchart of Sweep Execution Detection Processing

Figure 8:
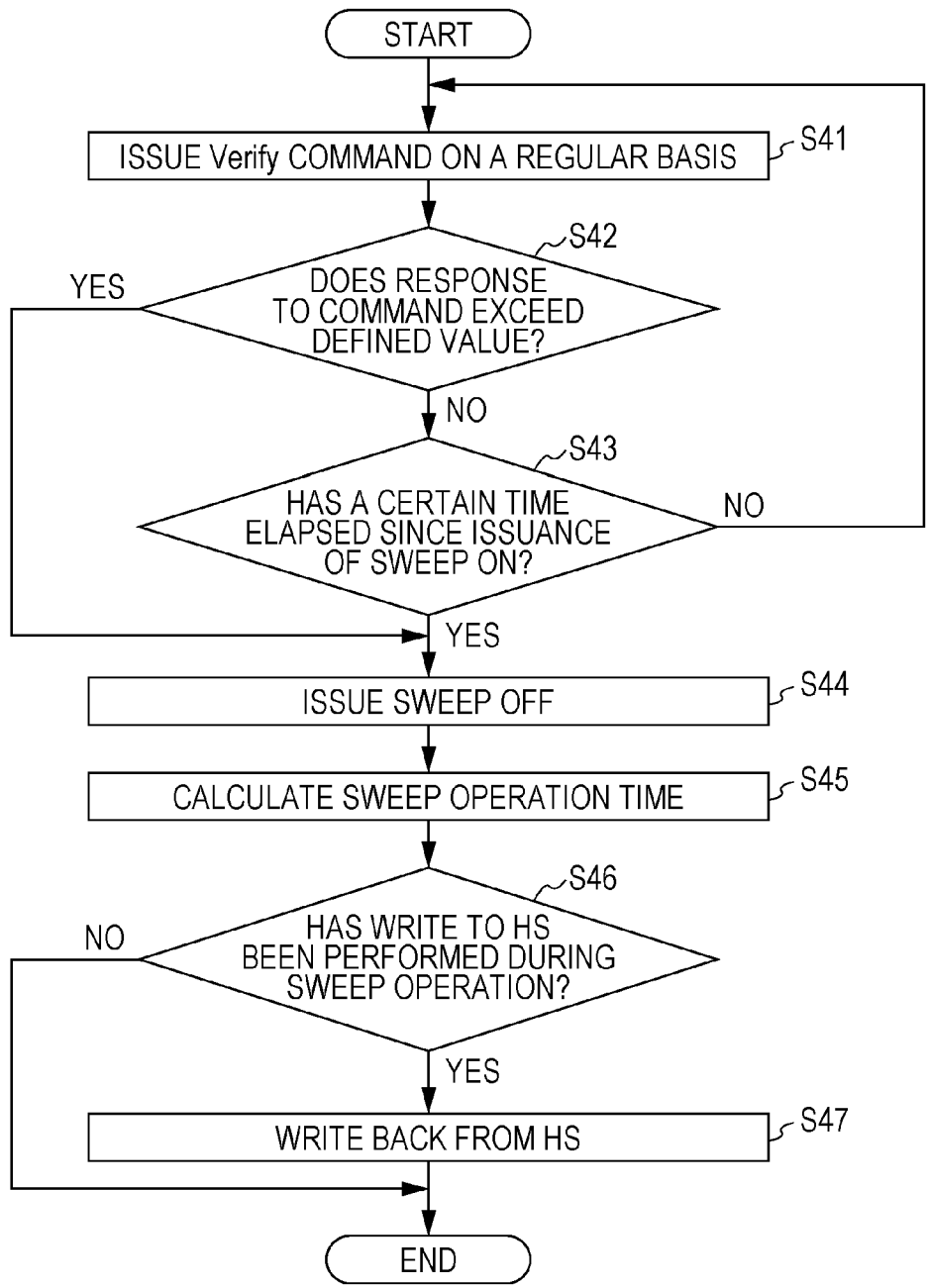
FIG. 8 is a flowchart of sweep execution detection processing.

Next, sweep execution detection processing is described with reference to FIG. 8. FIG. 8 is a flowchart of sweep execution detection processing. Note that, in FIG. 8, the storage device 1 is operated. Note that it is also assumed that, in one of the target disks included in the RAID group for which redundancy is maintained, the sweep on command has been issued.

The sweep execution detection unit 244 issues, for the target disk to which the sweep on command has been issued, the Verify command at regular intervals (Operation S41). The regular interval is, for example, 100 ms, but may be a value greater than the response time when the sweep operation is not executed.

The sweep execution detection unit 244 determines whether or not the response to the issued Verify command exceeds the defined value (Operation S42). The defined value is, for example, 400 ms, but may be a value with which it may be determined that the sweep operation has been executed. If the sweep execution detection unit 244 determines that the response to the issued Verify command exceeds the defined value (YES in Operation S42), the sweep execution detection unit 244 determines that the sweep operation has been actually executed, and the process proceeds to Operation S44.

If the sweep execution detection unit 244 determines that the response to the issued Verify command does not exceed the defined value (NO in Operation S42), the sweep execution detection unit 244 determines whether or not a certain time has elapsed since the sweep on command was issued (Operation S43). If the sweep execution detection unit 244 determines that the certain time has not elapsed since the sweep on command was issued (NO in Operation S43), the sweep execution detection unit 244 causes the process to proceed to Operation S41 to issue a next Verify command.

On the other hand, if the sweep execution detection unit 244 determines that the certain time has elapsed since the sweep on command was issued (YES in Operation S43), the sweep execution detection unit 244 does not capture the response and determines that the sweep operation has been already executed, and then, the process proceeds to Operation S44. The certain time is, for example, 10 seconds, but may be a value smaller than the issuance interval of the sweep on.

In Operation S44, since it is determined that the sweep operation has been actually issued, the sweep execution detection unit 244 issues the sweep off command for the target disk to which the sweep on command has been issued (Operation S44).

The sweep execution detection unit 244 calculates the sweep operation time for the target disk to which the sweep on command has been issued (Operation S45). That is, the sweep execution detection unit 244 calculates the sweep operation time that indicates the execution timing of the sweep operation. For example, the sweep execution detection unit 244 calculates as the sweep operation time a difference between the time at which the sweep off command is issued and the time at which the sweep on command is issued.

In this case, the sweep execution detection unit 244 calculates the average of the sweep operation time calculated from the calculated sweep operation time and the sweep operation time that has been calculated in past. Then, the sweep execution detection unit 244 sets the calculated average of the sweep operation time in the sweep operation time 25g corresponding to the target disk of the disk information storage unit 25.

The access control unit 245 determines whether or not a write to the HS has been performed during the sweep operation (Operation S46). That is, the access control unit 245 determines, for the target disk to which the sweep on command has been issued, whether or not a write request has been made and a write to the HS has been performed during the sweep operation time from the time at which the sweep on command was issued.

If the access control unit 245 determines that a write to the HS has been performed during the sweep operation (YES in Operation S46), the access control unit 245 writes back data that has been written to the HS to the corresponding sweep target disk (Operation S47). On the other hand, if the access control unit 245 determines that a write to the HS has not been performed during the sweep operation (NO in Operation S46), the access control unit 245 ends sweep execution detection processing.

Flowchart of Access Control Processing

Figure 9:
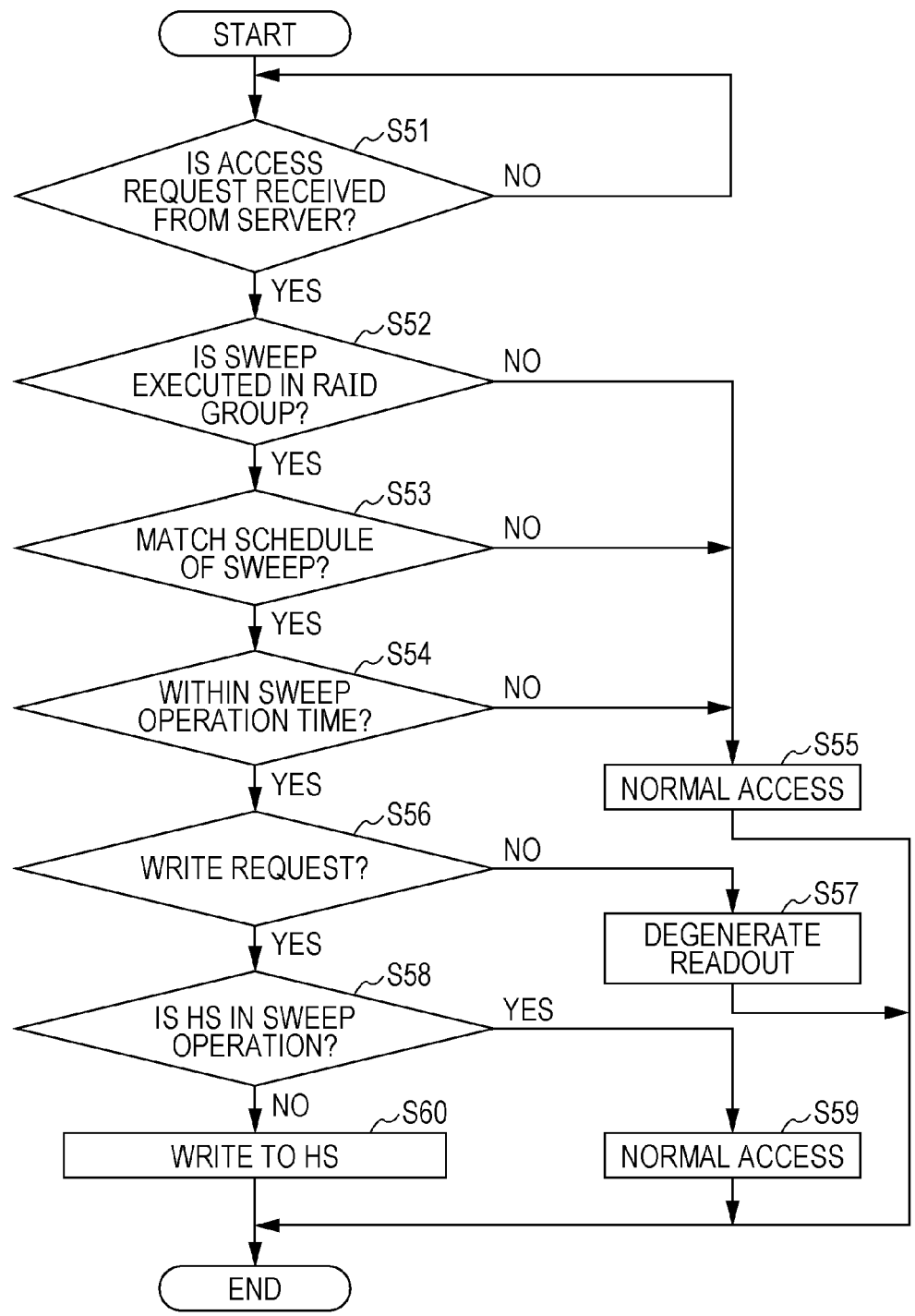
FIG. 9 is a flowchart of access control processing.

Next, access control processing is described with reference to FIG. 9. FIG. 9 is a flowchart of access control processing. Note that, in FIG. 9, the storage device 1 is operated. The RAID group illustrated in FIG. 9 is a RAID group for which redundancy is maintained. Also, the number of HSs is one in this case.

The access control unit 245 determines whether or not an access request has been received from the server 9 (Operation S51). If the access control unit 245 determines that an access request has not been received from the server 9 (NO in Operation S51), the access control unit 245 repeats determination processing until an access request is received. On the other hand, if the access control unit 245 determines that an access request has been received from the server 9 (YES in Operation S51), the access control unit 245 determines whether or not sweep is executed in the RAID group including a disk for which the access request has been made (Operation S52).

If the access control unit 245 determines that sweep is not executed in the RAID group including the disk for which the access request has been made (NO in Operation S52), the access control unit 245 causes the process to proceed to Operation S55 to perform normal access. On the other hand, if the access control unit 245 determines that sweep is executed in the RAID group including the disk for which the access request has been made (YES in Operation S52), the access control unit 245 determines whether or not the disk matches the schedule of sweep (Operation S53). For example, the access control unit 245 specifies a disk to which the sweep on command has been issued the most recently by the sweep execution control unit 243 and determines whether or not the specified disk is the disk for which the access request has been made.

If the access control unit 245 determines that the disk for which the access request has been made does not match the schedule of sweep (NO in Operation S53), the access control unit 245 causes the process proceeds to Operation S55 to perform normal access. On the other hand, if the access control unit 245 determines that the disk for which the access request has been made matches the schedule of sweep (YES in Operation S53), the access control unit 245 determines whether or not the time at which the access request was made is in the sweep operation time (Operation S54). For example, the access control unit 245 determines whether or not the time at which the access request was made is in the sweep operation time from the issuance of the sweep on command of the disk for which the access request was made. As the sweep operation time, the sweep operation time 25g of the disk information storage unit 25, which corresponds to the disk for which the access request was made, is used.

If the access control unit 245 determines that the time at which the access request was made is not in the sweep operation time (NO in Operation S54), the access control unit 245 causes the process to proceed to Operation S55 to perform normal access. In Operation S55, the access control unit 245 executes normal access. Note that the normal access in this case means access to the disk for which the access request was made.

On the other hand, if the access control unit 245 determines that the time at which the access request was made is in the sweep operation time (YES in Operation S54), the access control unit 245 determines whether or not the access request is a write request (Operation S56).

If the access control unit 245 determines that the access request is not a write request (NO in Operation S56), the access control unit 245 determines that the access request is a readout request, and executes degenerate readout (Operation S57). That is, the access control unit 245 executes a degenerate readout using a redundancy disk. For example, the access control unit 245 specifies a disk corresponding to the same RAID group as the RAID group 25b of the disk for which the access request was made, and executes a readout from the specified disk. Then, the access control unit 245 ends access control processing.

On the other hand, if the access control unit 245 determines that the access request is a write request (YES in Operation S56), the access control unit 245 determines whether or not the HS is in a sweep operation (Operation S58). If the access control unit 245 determines that the HS is in a sweep operation (YES in Operation S58), the access control unit 245 executes normal access (Operation S59). Note that the normal access in this case means a write of data to the disk for which the access request was made.

On the other hand, if the access control unit 245 determines that the access request is not in a sweep operation (NO in Operation S58), the access control unit 245 writes data for which the access request was made to the HS (Operation S60). Then, the access control unit 245 ends access control processing.

Advantages of Embodiments

According to the above-described embodiments, the sweep control unit 24 performs control for the disk 41, among the plurality of disks 41, which has a redundant structure stored in the disk information storage unit 25 and the RAID information storage unit 26 to set the execution timing of the sweep operation such that the sweep operation is executed for one disk at a time. With the above-described configuration, the execution timing of the sweep operation is set for the disk 41 which has a redundant structure such that the sweep operation is executed for one disk at a time, and thus, the sweep control unit 24 has no delay of response to the server 9 due to a sweep cause. As an example, even when a readout request is transmitted from the server 9 to the disk 41 for which the sweep operation is performed, the sweep control unit 24 may cause another disk 41 having a redundant structure to alternate the disk 41 and to perform a readout, and thus, a delay of response to the server 9 due to a sweep cause is not caused.

According to the above-described embodiments, the sweep control unit 24 determines, among the plurality of disks 41, a perspective disk for the sweep operation on the basis of a result of comparison between the actual capacity and the usable capacity for the disks 41. Subsequently, the sweep control unit 24 determines, among a plurality of the determined disks 41, a plurality of disks 41 having a redundant structure as target disks. Then, the sweep control unit 24 performs control for the plurality of determined target disks to set the execution timing of the sweep operation such that the sweep operation is performed for one disk at a time. With the above-described configuration, the sweep control unit 24 sets, as a sweep target disk, the disk in which a rut is likely to be generated and which has a redundant structure, and thereby, a delay of response to the server 9 due to a sweep cause of the disk in which a rut is likely to be generated is not caused.

According to the above-described embodiments, the sweep control unit 24 performs control for a plurality of target disks such that the sweep operation is executed at certain operation intervals. With such a configuration, the sweep control unit 24 averages the operation interval of the sweep operation for the plurality of target disks, and thereby, the occurrence of competition of the sweep operation and access of the server 9 may be averaged.

According to the above-described embodiments, the sweep control unit 24 issues the sweep on command for a target disk, among a plurality of target disks, for which the operation time is reached in accordance with the operation interval of the sweep operation. Furthermore, the sweep control unit 24 issues a predetermined command that causes an access to the target disk on a regular basis and sets a period from the time at which the operation time is reached to the time at which a response to the issued predetermined command exceeds the defined value as the execution timing of the sweep operation. With the above-described configuration, the sweep control unit 24 may set the execution timing of the sweep operation for the target disk, and thus, may easily determine whether or not an access from the server 9 competes against the sweep operation using the execution timing of the sweep operation.

According to the above-described embodiments, the sweep control unit 24 monitors the execution timing of the sweep operation for a plurality of target disks. Then, when a readout request is transmitted from the server 9 to a target disk for which the sweep operation was performed in a period which is the execution timing of the sweep operation, the sweep control unit 24 executes readout processing for the target disk having a redundant structure. With the above-described configuration, even when a readout request transmitted from the server 9 and the sweep operation compete against one another, the sweep control unit 24 may ensure an optimal response to the server 9.

According to the above-described embodiments, the sweep control unit 24 monitors the execution timing of the sweep operation for a plurality of target disks. When a write request of writing data is transmitted from the server 9 to the target disk for which the sweep operation was performed in a period which is to be the execution timing of the sweep operation, the sweep control unit 24 write the data to the HS. Then, after the sweep operation is executed, the sweep control unit 24 writes back the data from the HS to the target disk for which a write request was made. With the above-described configuration, even when a write request transmitted from the server 9 and the sweep operation compete against one another, the sweep control unit 24 may ensure an optimal response to the server 9.

Other Advantages

Note that the storage device 1 illustrated in FIG. 1 has a configuration which does not includes a power supply unit that supplies power when the power is out. However, the storage device 1 may have a configuration including a power supply unit. In that case, in the sweep control unit 24, the sweep operation is not executed in a period in which the power is off or a period in which the power is out. Thus, the sweep control unit 24 may reduce time which it takes to back up data held in a cache memory (not illustrated) to the disk 41.

Moreover, each element of the storage device 1 illustrated in FIG. 1 may be physically configured in a different manner from the configuration illustrated in FIG. 1. That is, the specific mode of dispersion and integration of the storage device 1 is not limited to the illustrated mode of dispersion and integration, and all or a part thereof may be functionally or physically dispersed or integrated in an optional unit according to various types of loads, the state of use, and so forth. For example, the disk determination unit 241 and the HS group forming unit 242 may be integrated as a single unit. The sweep execution control unit 243 may be dispersed into a first execution control unit that executes pre-sweep execution processing and a second execution control unit that executes sweep execution processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device which includes a plurality of magnetic disk drives comprising:
    a storage unit that stores, for each of the plurality of magnetic disk drives, information of whether or not the magnetic disk drive is incorporated in a redundant structure;
    a specifying unit that specifies, among the plurality of magnetic disk drives, a plurality of magnetic disk drives which have a redundant structure on the basis of the information stored in the storage unit; and
    a control unit that controls, for the plurality of magnetic disk drives specified by the specifying unit, an execution timing of sweep operation in which a head smoothes a lubricant material such that the sweep operation is executed for a single magnetic disk drive at a time.

2. The storage device according to claim 1,
wherein the specifying unit determines, among the plurality of magnetic disk drives, a plurality of perspective magnetic disk drives for which the sweep operation is executed on the basis of a result of comparison between an actual capacity and a usable capacity of the corresponding magnetic disk drive and specifies, among the determined perspective magnetic disk drives, a plurality of magnetic disk drives which have a redundant structure.

3. The storage device according to claim 1,
wherein the control unit perform control for the plurality of magnetic disk drives specified by the specifying unit such that the sweep operation is executed at certain operation intervals.

4. The storage device according to claim 1, further comprising:
    a processing execution unit that monitors the execution timing of sweep operation controlled by the control unit for the plurality of magnetic disk drives specified by the specifying unit and executes, when a readout request is transmitted from a superordinate device to the magnetic disk drives for which the sweep operation has been performed in a period which is to be the execution timing of sweep operation, readout processing to the magnetic disk drives that have a redundant structure.

5. The storage device according to claim 4,
wherein the processing execution unit furthermore monitors the execution timing of sweep operation controlled by the control unit for the plurality of magnetic disk drives specified by the specifying unit, writes, when a write request for writing data to the magnetic disk drive for which the sweep operation has been performed is transmitted from the superordinate device, the data to a spare storage device, and writes back, after the execution of the sweep operation, the data from the spare storage device to the magnetic disk drive for which the write request has been made.

6. The storage device according to claim 5,
wherein the control unit further issues a command that promotes the sweep operation for the magnetic disc drive for which an execution time of the sweep operation is reached, issues, in addition, a predetermined command that causes an access to the magnetic disk drive on a regular basis, and sets as the execution timing of sweep operation a period from time at which the execution time of the sweep operation is reached to time at which a response to the issued predetermined command exceeds a defined value.

7. A sweep operation control method comprising:
causing a storage device including a plurality of magnetic drives to execute
specifying, on the basis of information of whether or not the magnetic disk drive has a redundant structure for each of the plurality of magnetic disk drives, a plurality of magnetic disk drives, among the plurality of magnetic disk drives, which have a redundant structure, and
controlling, for the plurality of magnetic disk drives specified by the specifying, an execution timing of sweep operation in which a head smoothes a lubricant material such that the sweep operation is executed for a single magnetic disk drive at a time.

8. A non-transitory computer-readable recording medium having stored therein a program for causing a computer to execute a process for controlling a sweep operation, the process comprising:
    specifying, on the basis of information of whether or not the magnetic disk drive has a redundant structure for each of a plurality of magnetic disk drives, a plurality of magnetic disk drives, among the plurality of magnetic disk drives, which have a redundant structure, and
    controlling, for the plurality of magnetic disk drives specified by the specifying, an execution timing of sweep operation in which a head smoothes a lubricant material such that the sweep operation is executed for a single magnetic disk drive at a time.

* * * * *